United States Patent [19]

Albert

[11] Patent Number: 4,688,901
[45] Date of Patent: Aug. 25, 1987

[54] LIQUID CRYSTAL LIGHT VALVE METHOD AND APPARATUS USING RIGHT AND LEFT-HANDED TWIST CHOLESTERIC LIQUID CRYSTAL

[75] Inventor: Richard Albert, Seymour, Conn.

[73] Assignee: Johnson Light Valve Inc., Norwalk, Conn.

[21] Appl. No.: 619,576

[22] Filed: Jun. 11, 1984

[51] Int. Cl.[4] .................................................. G02F 1/13
[52] U.S. Cl. .................................. 350/350 S; 350/351
[58] Field of Search ........................... 350/350 R, 351

[56] References Cited

U.S. PATENT DOCUMENTS

| | | | |
|---|---|---|---|
| 3,872,050 | 3/1975 | Benton et al. | 350/351 X |
| 4,274,713 | 6/1981 | Krueger | 350/349 X |
| 4,556,289 | 12/1985 | Fergason | 350/350 R |

Primary Examiner—John K. Corbin
Assistant Examiner—Richard F. Gallivan
Attorney, Agent, or Firm—Parmelee, Bollinger & Bramblett

[57] ABSTRACT

A liquid crystal light valve is provided which either reflects or transmits all wavelengths of light. Micron size cholesteric liquid crystal micelles are formed by adding a chiral molecule dopant to a nematic liquid and dispersing into a polymeric solution. The chiral dopant twists the micelle into a helical planar order along a helical axis. The interior structure of the micelle is a series of concentric spheres, the distance between the envelopes of which is the pitch. The pitch of the helical planar order of the micelles is adjusted by varying the concentration of chiral molecules which have been added to the nematic liquid. The sense of the helical planar order of the micelles is controlled and the micelles are dispensed in an inert polymeric binder forming a film which may be applied to a surface for controlling the light applied thereto either passing or reflecting the light depending on the temperature of the film. The light valve is controlled in one way by controlling the right and left hand sense of the helical planar order of the micelles by adding equal amounts of chiral dopants which have right and left handed orders.

10 Claims, 9 Drawing Figures $$P \cong \frac{CONSTANT}{MOLE\%}$$

RELATIONSHIP BETWEEN PITCH AND CHIRAL ADDITIVE CONCENTRATION $$P \cong \frac{CONSTANT}{T}$$

RELATIONSHIP BETWEEN PITCH AND TEMPERATURE

LIQUID CRYSTAL LIGHT VALVE METHOD AND APPARATUS USING RIGHT AND LEFT-HANDED TWIST CHOLESTERIC LIQUID CRYSTAL

BACKGROUND OF THE INVENTION

This invention relates to temperature actuated variable neutral density filters and more particularly to liquid crystal dispersions which are formed into a film and used on a variety of surfaces and in combination with polarizers and/or half wave and/or quarter wave length plates for reflecting or transmitting the visible and infrared spectrum in accordance with the temperature of the film in which the cholesteric liquid crystal micron size dispersion called micelles are embedded.

Liquid crystals are materials whose molecules arrange themselves in ordered groupings having many characteristics of crystals. As an example, a crystalline solid such as diamond or table salt is characterized by molecules having both positional and orientational order. A simple crystalline solid has a single repeating molecule or unit which is placed or oriented with respect to a neighboring unit with the sequence repeated over and over which repetition and orientation is responsible for the crystalline state. If the crystalline solid loses both its positional and orientational order, the solid converts into an amporphous order which is easily brought about by heat. The degradation of the crystal into an amorphous mass proceeds in stages. The first stage is loss of either positional or orientational order with the next stage being the loss of both. Materials which retain the orientational but lack the positional order are liquid crystal materials. An essential characteristic of the liquid crystal molecules are that they all point in the same direction and are characterized by being long and narow. Liquid crystals fall into three classes, nematic, smectic, and cholesteric which all share a common characteristic of orientational molecular order. Nematic liquid crystals have molecules all pointing more or less in the same direction and all having their long axis parallel to each other but free to move in any direction. In the smectic liquid crystalline phase the molecules are aligned in parallel layers with any two layers free to slide over each other as long as the individual molecules do not move out of their layers. In the cholesteric phase molecules slide parallel in layers with the alignment axis shifting in each successive layer so that a helix is traced out through the various layers. The aforesaid liquid crystal phases exist only over a limited range of temperatures and below such temperatures the liquid crystal may become a solid with crystalline properties and above it the material may cease to be a crystalline liquid and may become an ordinary liquid with isotropic properties.

The present invention is interested in the characteristics of thin films of cholesteric liquid crystals which exhibit a property upon the interaction with light which may be termed selective scattering. Scattering is used rather than reflection in order to distinguish from the effect occurring on a mirrored surface wherein light is reflected at an angle equal to the angle of incidence. In viewing the light impinging on a film on the same side at which it is viewed, a selectively scattering film has an apparent color which is the complement of the color of the light transmitted by the film. In other words, the light scattered by the film is within a wave length band which if added to the transmitted light through the material would form white light if white light is what was incident on the film. Most materials do not selectively scatter light in that the light transmitted through them is not complementary to the light scattered by them but rather is within the same wave length band. The phenomenom of selective scattering exhibited by cholesteric liquid crystal film is independent of whether the light illuminating the film is polarized or not and the color and intensity of the scattered light depends upon the temperature of the scattering material and upon the angle of incidence of the illumination.

If a cholesteric liquid crystalline film is illuminated with circularly polarized light in addition to selective scattering, it also exhibits the property of circular dichroism which may be defined as differential interaction of a material upon circularly polarized light of different senses. Unpolarized light comprises right and left handed circularly polarized components of equal intensity. Upon interaction with a film of circularly dichroic material the right handed component is transmitted with a different intensity than the left handed component. The extent of the difference is a function of the temperature in the cholesteric liquid crystalline material. The cholesteric liquid crystal material also exhibits optical activity which may be observed by illuminating the material with linearly polarized light. Due to the optical activity of the material the polarization vector of the light is caused to rotate and the amount of this rotation is dependent upon the temperature of the material.

These particular characteristics of cholesteric liquid crystalline material have been used, for example, for converting thermal patterns to visible patterns, for indicating temperatures and in many forms of display as well as a variety of decorative articles. As such these uses are limited and specific.

Coated glass and plastic products selectively filter light and as such do not really control the brightness of the complete light spectrum, but give off a characteristic color corresponding to that color which is reflected or otherwise filtered out by the coating which has been applied to the transparent surface. Accordingly, it would be useful to be able to control the entire spectrum of the light such that it appears monochromatic and not colored or metallic, and further so that it can be used selectively to reflect or scatter infrared for passing visible light independently.

SUMMARY OF THE INVENTION

Accordingly, it is an object of this invention to provide a new and improved method and apparatus for controlling over the entire visible and infrared bands the reflection or transmission of electromagnetic radiation applied thereto.

A further object of this invention is to provide a method for making a light valve which alters the brightness of incident radiation depending on temperature.

Still a further object of this invention is to provide a new and improved light valve and method for making the same which can be used to selectively reflect heat and visible light independently which is useful for coatings having varying properties in winter and summer months to enhance heating and lighting conditions with changes in temperature.

A further object of this invention is to provide a new and improved light valve which is suitable for automobile windshields as well as coatings on buildings, greenhhouses, eyeglasses and solar connectors and the like.

In carrying out this invention in one illustrative embodiment thereof, a light valve is provided which reflects or transmits all wave lengths of light. The light valve is made by forming micron size nematic liquid crystal micelles and by adding chiral molecule dopants which twists the micelle into a helical planar order along a helical axis. The pitch of the helical planar order of the micelles is adjusted by varying the concentration of the chiral molecules in the nematic liquid. The right and/or left handed sense orientation is also controlled by the amount and type of dopants which are added for controlling the helical planar order of the micelles. The micelles are dispensed in an inert polymeric binder forming a film whose temperature controls the light valve properties of passing or reflecting light applied thereto.

In one form equal amounts of right and left handed sense chiral dopants are added. The film formed in the manner described above provides the basic light valve which may be applied and utilized on various glass and plastic surfaces for controlling the light passing therethrough in accordance with temperature.

The basic light valve may be also utilized between polarized sheets having optical axis which are mutually perperndicular on opposite sides of the film or between a quarter wave plate and a polarizer having the optical axis of the polarizer at 45° with respect to the optical axis of the quarter wave plate or may be utilized on the front and back surfaces of a half wave plate or a third series of micelles may be added providing large particles which in effect reflects infrared radiation from 8 microns to 15 microns below 20° C. and transmits such heat energy above 20° C.

BRIEF DESCRIPTION OF THE DRAWINGS

The invention, together with further aspects, objects, advantages and features thereof will be more fully understood by reference to the following description taken in conjunction with the accompanying drawings which it should be appreciated are enormously enlarged and diagramatically illustrated for aiding in the illustration and explanation of the invention.

DESCRIPTION OF THE PREFERRED EMBODIMENTS

Figure 2:
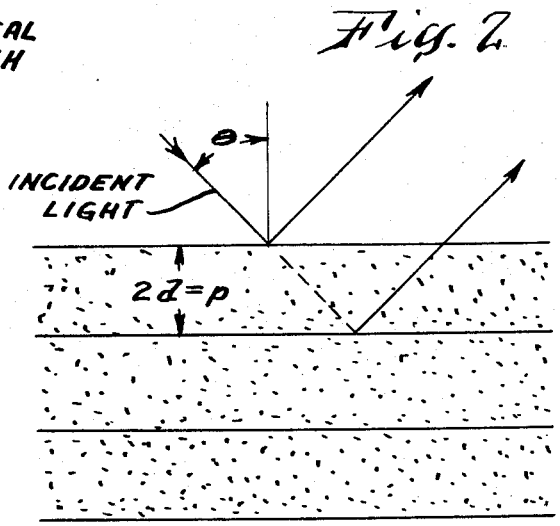
FIG. 2 is a diagramatic illustration of Bragg scattering from a micelle of the type diagramatically illustrated in FIG. 1.
Figure 3:
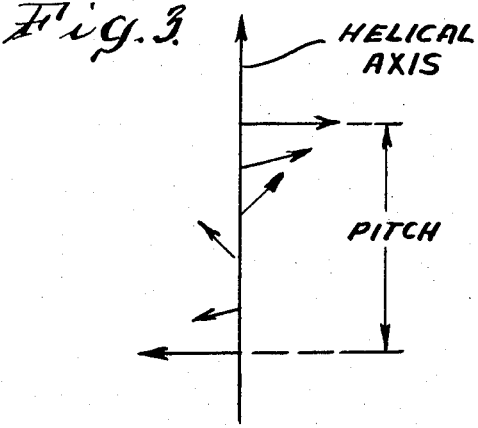
FIG. 3 is a diagramatic illustration of the cholesteric liquid crystalline state.

Generally the light valve of the present invention is a temperature activated variable neutral density filter which below a predetermined temperature transmits nearly 100% of all of the wave lengths in the visible and infrared portions of the spectrum. Above the predetermined level temperature nearly 100% of the light is reflected. In attaining these characteristics the light valve employs the cholesteric liquid crystalline properties which have been described hereintofore. The cholesteric liquid crystalline state of the present light valve is derived by adding a dopant in the form of a disymmetric or chiral molecule to a nematic liquid. As pointed out, the nematic liquid crystal has molecules all pointing more or less in the same direction but are not lined up or arranged in any other way, and the center of gravity of the molecules move in a highly disordered fashion. With the addition of a disymmetric or chiral molecule to a nematic liquid, the nematic liquid changes onto a cholesteric liquid crystal. The chiral molecule is not superimposable on its mirror image and no two orientations in space of a chiral molecule are identical. Placing a chiral molecule into a nematic liquid disturbs the molecular order in a way such that it is not cancelled out by another orientation of another chiral molecule. The disturbance of all the chiral molecules are additive in the nematic liquid which accommodates the additives by twisting into a helical organization. The accommodation of the chiral molecules in the nematic liquid crystal is due to steric repulsion and the helix is a consequence of the disymmetry of the steric repulsion. Within any plane cutting through the cholesteric liquid crystal all molecules have oriented in the same direction. An axis passing through and perpendicular to these planes is defined as the helical axis. One plane located above another is slightly rotated or twisted with respect to that plane about the helical axis. Proceeding along the helical axis the orientation of the planes eventually repeats with the smallest distance between similarly oriented planes being referred to as the helical pitch p. These orderly arranged planes give rise to Bragg scattering illustrated in FIG. 2. Where the angle of incidence ($\theta$) and the spacing d between identically oriented planes and the refractive index ($\eta$) satisfies the Bragg relation $2\eta d \sin \theta = \lambda$ there is a strong reflection of the light of wave length $\lambda$. The color produced is sensitive to temperature due to the changes in spacing and is the basis for the use of cholesteric liquid crystals as temperature indicators. If the entire visible spectrum is reflected by different layers, the reflected light is then monochromatic which is what is achieved by the present invention.

Figure 1:
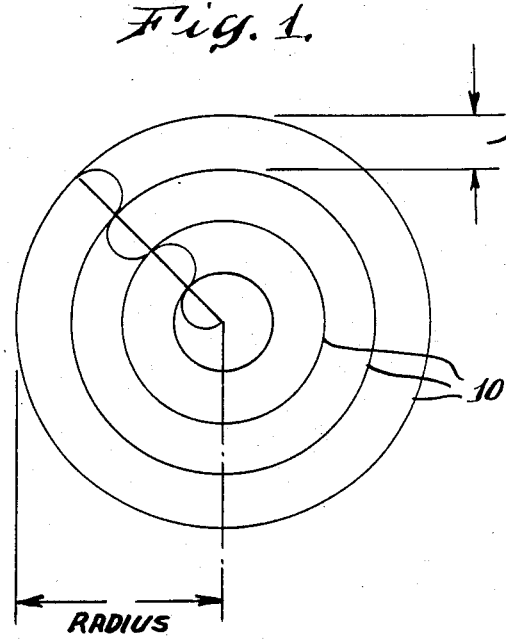
FIG. 1 is a diagramtic illustration of the microsphere or micelle which is a droplet of cholesteric liquid crystalline oil.

The light valve in accordance with the present invention is composed of micron size dispersions of cholesteric liquid crystalline oil in an inert polymeric binder. Each droplet of oil called a micelle has a highly ordered internal structure which is a consequence of the liquid crystalline nature of the oil. The micelle structure viewed microscopically appears as a series of concentric rings or spheres spaced d units uniformly apart. This layered structure reflects the light with a mechanism resembling Bragg scattering described above. The reflection is wave length specific and depends on repeating optical path lengths in d between concentric spheres and the angle of incidence. Micelles reflect different wave lengths through variation of the repeat distance in d between concentric spheres or rings 10 illustrated in the diagramatic representation of the micelle shown in FIG. 1. The helical axes lie along radii and the planes along adjacent helical axes coalesce. These planes with planar orientation perpendicular to the light bend the light most and become visible under the microscope as concentric rings or spheres. Whenever normally incident light has a wave length λ equal to the index of refraction and the pitch, reflection strongly occurs.

Reflection from cholesteric material is unique in that the reflected light is circularly polarized. The sense of this reflected light is the same as the sense of the cholesteric helix. Thus, right circularly polarized light incident on a right handed helix is reflected while left-handed circularly polarized light is transmitted. Since ordinary monochromatic light is a mixture of left and right hand circularly polarized incoherent radiation, a layer of cholesteric material reflects half and transmits half of the incident light. The light valve of the present invention is designed to reflect all the incident light using the optical properties of cholesteric liquid crystal while avoiding multi-layers of liquid crystal.

In accordance with the present invention, each micelle is independently constructed to have a right or left handed helix thereby reflecting light of a desired wave length and becoming active at a specific temperature in accordance with the following examples which have been chosen for the purpose of illustrating the invention.

EXAMPLE I

Figure 4:
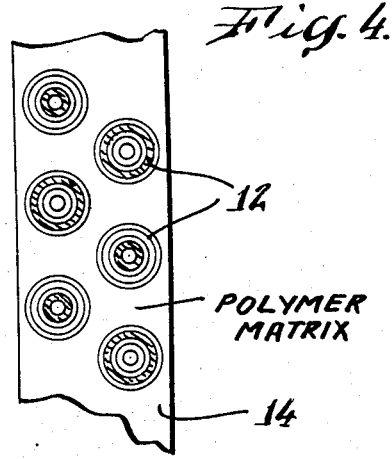
FIG. 4 illustrates one form of light valve embodying the present invention in which a plurality of right and left handed sense micelles are dispersed in a polymer matrix.

The basic light valve is a dispersion of cholesteric liquid crystal micelles 12 in a thin (2-10 mils) polymeric film 14 as illustrated in FIG. 4. The dispersed micelles 12 of liquid crystal are a collection of those which reflect light from 400 to 600 nm in 20 nanometer increments. Twenty-two groups of micelles reflect light in 20 nm intervals at 400±20 nm, 420±20 nm, 440±20 nm, etc. Each group is repeated twice to reflect both left and right circularly polarized light. The basic light valve turns on when a phase transition temperature brings the micelle from the smectic into the cholessteric state. The temperature of the phase transition is composition dependent. A simple binary mixture of the nematic host and chiral dopant is one in which no solid solution forms. Such a binary mixture has at some composition a eutectic or minimum boiling point. At all other compositions, the melting point temperature is given by the Schroeder-Van-Laar equation. Above the melting point the mixture is liquid crystalline up to another transition temperature at which the mixture is isotropic. The mesophase range between the melting and isotropic temperatures varies with the composition. Only within the mesophase of liquid crystalline range does the light valve function. A series of compositions are made with CE2 to E-8 (a commercial liquid crystal mixture and chiral additive from BDH) such that the weight percent of CE2 ranges from 15% to 24% in increments of 0.8%. A second series of compositions are made with the optical enantiomer of CE2 over the same composition range. Each liquid composition is emulsified separately in polyvinylalcohol (80% hydrolyzed). Twenty gm of the liquid crystal mixture is added to 0.1 gm of Igepal 640 (GAF Corporation) 1% aqueous solution and 80 gm of a 28% aqueous PVA solution. The mixture is stirred with a high speed mixer for 5 min. or until a uniform distribution of micelles 3-5μ is formed.

The chiral additive is not limited to CE2 but can include any optically active molecule. An optically active molecule belongs to a class of molecules having no center plane of inversion axis of symmetry. Such molecules are generally described as having assymmetric centers or as having an overall disymmetry. An optically active molecule is characteristic of those molecules which in solution rotate the plane of linearly polarized light. Examples of chiral molecules which have asymmetric center but not delimited by this list are S-(+)-4-(2'-methylbutyl) phenyl 4-substituted benzoates, S-(+)-4-(2'-methylbutyl) phenyl trans-4-alkylcyclohexane-1-carboxylates, (+)-4-(3''''-methylpentyl)-4''cyano-p-terphenyl, (+)-4-(3)''-methylpentyl)-4'cyanobiphenyl, (+)-1,2-(4'-[4'-(2''''-methylbutyl)biphenyl]-4'''cyanophenyl]ethane, d-isodymlbenzoate d and 1-α-phenylethylamine, menthol cholesterylnonanoate, cholesterylchloride, cholesteryl myristate, p-d-isobutyloxybenzlidene, p-cyanoaniline and other molecules containing one or more asymmetric centers. Examples of chiral molecules which have disymmetry but not delimited by this list are bibenzo[b,f] diazocine-1,4,6,7-diphenyl-5,8-diaza-dinaphtho-2'1'cycloactatatraene, benzo[c.e]cyclo-octanone and other molecules which do not have any centers of asymmetry, centers of inversion or planes of symmetry. Although any chiral additive functions are desirable, chiral dopants have large helical twisting power, high solubility in the host, more than one chiral center, structures similar to the host, no lower lying real, monotropic or virtual smectic phases, and insensitivity to temperature.

Representative of desirable chiral additives are N-(S)-1-phenylethyl 4-n-heptylphenyl-benzamide, 4-(4'-octylphenylbenzoyloxy)-benzylidene-(s)-1-phenylethylamine, p-s-(+)-2-methylbutylphenyl 4-(4'-s-(+)-2-methylbutylphenyl)benzoate and bis-1,4-(p-s-(+)-2-methylbutylbenzoyloxy) benzene.

Examples of liquid crystal mixtures useful in practicing this invention but delimited by them are the commercially prepared E-38(BDH), E-43(BDH) JE-80A(BDH), ROTN404(ROCHE) ROTN615-(ROCHE), ZLI-1291(MERCK), N-4(MERCK) and other compositions based on mixtures of Schiff bases, mixtures of alkyl and alkoxy-cyanobiphenyls mixtures of Demus esters, cyanobiphenyls and mixtures of cyclohexylcylohexane, or phenyldioxanes.

The polymeric binder is selected from those thermoplastic and thermoset materials which upon curing give tough, plastic, flexible films. In addition to polyvinylalcohol (Elvanol 7124 or Elvanol 5105, Dupont), polymethylmethacrylate (Acryloid B-72 ROHM and HAAS), gelatin, nitrocellulose (HERCULES), polyvinylbutyral(Butvar (MONSANTO) grades B72, B73, B90), alkyd resins (Paraplex RG-2, RG-2, RGA-7 (ROHM and HAAS CO.) and polyurethane (SPENCER-KELLOGG F78 50MS).

The chiral additive is not limted to a single member of the class of optically active molecules but can contain mixtures of optically active molecules. The benefit obtained from mixtures of chiral molecules is to enhance the total chiral content and to control variation of pitch with temperature.

The relationship between pitch and chiral additive concentration is a linear inverse one. For a mixture of two or more chiral additives, the inverse of the pitch is gotten from the sum of products. The product is composed of two terms, the chiral additive concentration and the helical twisting power. For a given concentration the larger the helical twisting power the smaller the pitch. The helical twisting power is slightly different in different hosts.

Desirable mixtures of chiral additives have both right and left-handed sense representatives, large helical twisting powers differing derivatives of pitch with respect to temperature, no interaction, high solubility, and no induced smectic phases. Desirable concentration ranges for both single and multiple chiral additives range from 17% to 20% for chiral additives which are chemically different from the host material. Desirable concentration ranges for single and multiple chiral additives which are chemically similar to the hose material range from 1% to 90% of the total mixture.

The temperature for the light valve is determined by the mesophase range of the liquid crystal material. Materials of liquid crysal composition have crystalline to mesophase transitions as low as $-50°$ C. and mesophase to isotropic liquid transitions as high as 200° C. Although light valves containing liquid crystal compositions respond to those extremes of temperature, the most desirable temperatures extend from a low of 10° C. to a high of 40° C.

To modulate light in the infrared wave length region, the light valve is constructed from a compensated mixture of CB-15(p-S-(+)-2-methylbutylcyano-biphenyl and cholesteryl chloride. The composition is adjusted to $20\mu$ to reflect infrared radiation between 15 to $30\mu$ below 30° C. and transmit this radiation above 35° C.

To form an infrared reflecting light valve a mixture of 100 mg cholesteryl chloride in 500 $\mu$ROTN615 at 35° C. (ROCHE) was added dropwise with stirring a mixture of 100mg CB15 (BDH) at 35° in 500 $\mu$ROTN615 until the final composition was 10.72% of cholesteryl chloride and 9.28% CB15. This mixture showed all the properties of a compensated nematic liquid crystal. The procedure is repeated 6 more times increasing the cholesteryl chloride and CB15 concentration in increments of 5 cmg so as to prepare in total 7 compensated mixtures.

A second series of 7 mixtures are prepared similarly except the titration of cholestryl chloride in ROTN 615 with CB15 was done at 10° C. The final compensated mixture contained 10.73% cholestryl chloride and 10.08% CB15. For the second series above 10° C. the sense of the pitch is opposite to that below 10° C. At room temperature the first and second series have the same pitch but opposite sense but above 35° the first series switches to the same pitch and sense as the second series.

A composition of the first and second series of 14 mixtures dispersed as small (ca 50 to $300\mu$) particles in a polyurethane film forming latex. The film made from 100 mg of polyurethane latex (OLIN CORP.) and 100 mg of the compensated liquid crystal was stirred by hand slowly for 1 minute at room temperature.

EXAMPLE 2

Figure 5:
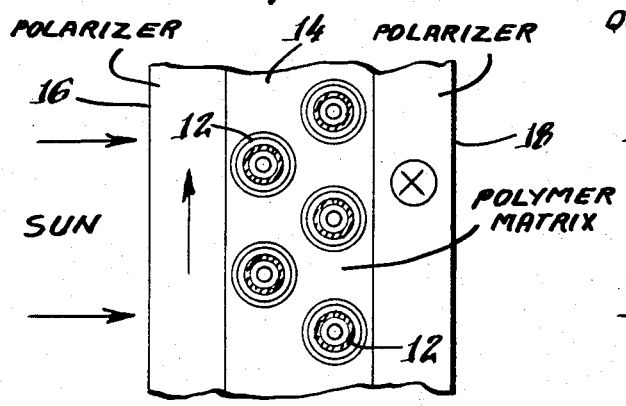
FIG. 5 illustrates the light valve of the present invention used in conjunction with and sandwiched between two polarizers.
Figure 6:
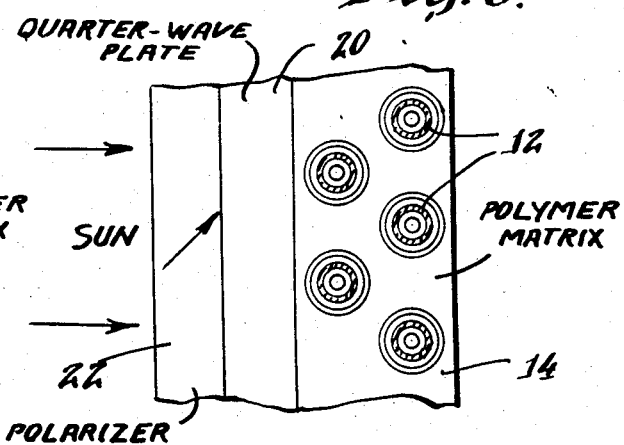
FIG. 6 illustrates the use of the light valve of the present invention in conjunction with a quarter wave plate and a polarizer.
Figure 7:
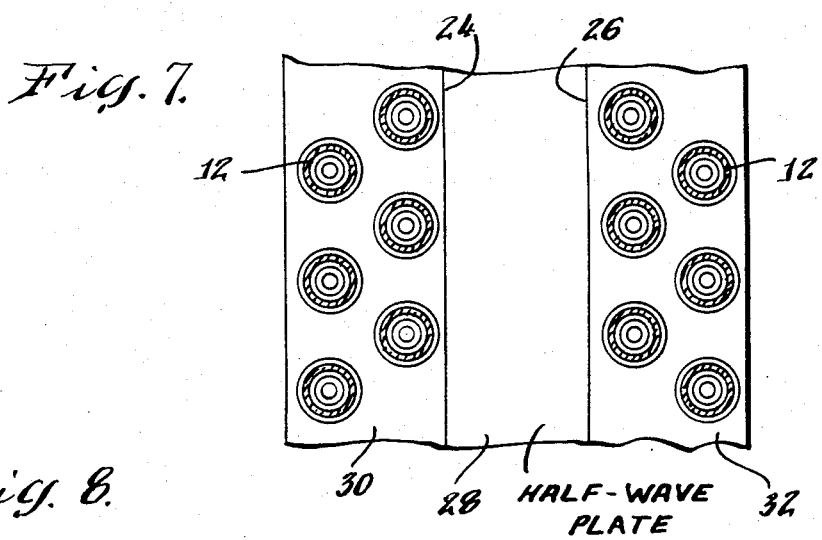
FIG. 7 illustrates the use of a half wave plate coated on each side with a film of the light valve in accordance with the present invention.

A light valve is constructed from a dispersion of a cholesteric liquid crystal dispersed in a thin polymeric film. The dispersed cholesteric liquid crystal oil is $2-10\mu$ in diameter. The chiral additive concentration is adjusted so that the product of the average refractive index and the pitch exceeds 1 micron. The cholesteric oil is emulsified in a suitable polymer such as polyvinyl-alcohol, gelatin, polyurethane or vinyl polymers. A film of the emulsion is drawn and dried. On the front and back surfaces of the film is applied polarized plastic sheets whose optical axis are mutually perpendicular as shown in FIG. 5. Above the mesophase to isotropic state transition temperature, no light transmitted. Below the isotropic transition temperature, light passes through the film 14. The large pitch cholesteric phase transforms the linearly polarized light formed by the polarizer 16 on the front surface into circularly polarized light. Circularly polarized light passes uninhibited through the second polarizer 18. Above the transition temperature, no circularly polarized light forms and only the polarized light from the front polarizer 16 is blocked by the second polarizer 18. Transmission ranges from 50% below to 0% above the transition temperature. To form this valve, 40 parts of 3% solution of CE2 in p-methoxybenzylidene-p-butoxyaniline (with isotropic temperature of 42° C.) is dispensed in 60 pt of an acrylic latex. The dispersion is stabilized with 1 part of 1% aqueous Tween 20. The mixture is stirred at high speed (1000 rpm) for 5 minutes. The resulting dispersion is cast on polarizing film. Two properly oriented polarizing films 16 and 18 coated with the emulsion are pressed together to make the light valve. By selecting mixtured liquid crystalline material to operating range is broadened. For example, a mixture of p-methoyxbenzylidene-p-butoxyaniline and 60% p-ethoxybenzylidene-p-butoxyaniline allows the light valve to function between 10° C. to 75° C.

EXAMPLE 3

The cholesteric emulsion described in Example 2 is cast on a quarter wave plate 20 (cellophane) and also on a plastic polarizer 22. The coated quarter wave plate 20 and coated polarizer are joined together with the optic axis of the polarizer at 45° to the quarter wave plate axis.

Below the crystalline or smectic to cholesteric transition 50% of the light passes through the valve. Above the transition temperature, the transmitted light is extinguished. Similarly, as in Example 2, a series of liquid crystalline hosts are chosen to broaden the temperature range over which the valve darkens.

EXAMPLE 4

The mixture of liquid crystal and chiral dopant is similar to those employed in Example 1 except only one chiral sense was used. The dispersion of liquid crystals in film forming polymer is coated on the front 24 and back surfaces 26 of a half-wave-plate 28 (double thick cellophane). Light passing the half-wave-plate from the front coating 30 has the circular polarization reversed. The light is reflected by the second emulsion 32 on the back surface.

EXAMPLE 5

To the compositions described in Example 1 is added a third series of micelles. In this series the chiral dopants d and 1-CB-15 (BDH) is varied from 1% to 2% to give a helical pitch ranging from $8\mu$ to $15\mu$. The emulsions formed for this series have large particles $50\mu$ to $150\mu$ in diameter. The emulsion is formed by mixing for short time periods at low speed. The liquid crystal host is selected such that the mesophase range extends from $-10°$ C. to 20° C. Within this range heat energy in the $8\mu$ to $15\mu$ range is reflected. Above 20° C. heat is transmitted through the valve.

Figure 8:
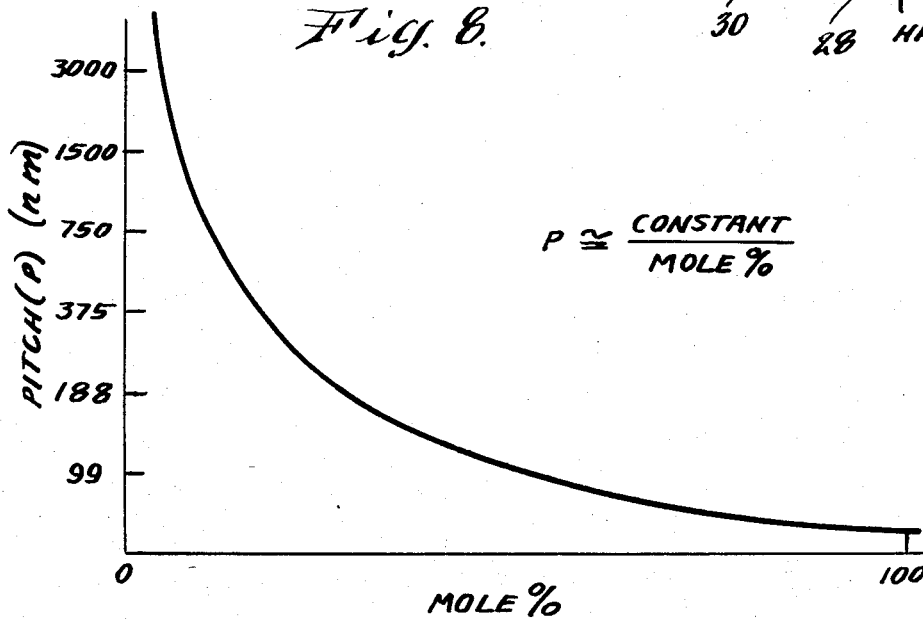
FIG. 8 is a diagram illustrating the relationship between the pitch and chiral additive concentrations of the light valve of the present invention.
Figure 9:
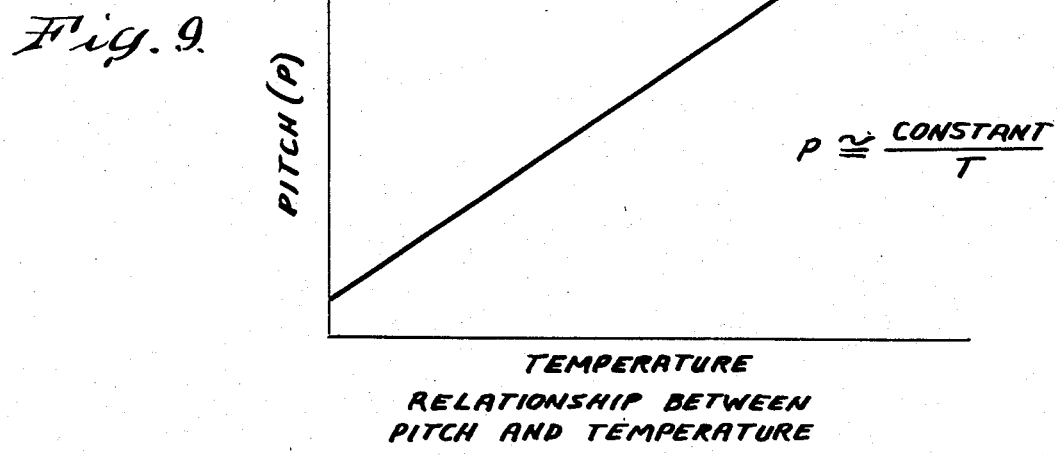
FIG. 9 is a diagram of pitch versus temperature illustrating the relationship between the pitch and the temperature of the film used in the light valve of the present invention.

FIGS. 8 and 9 illustrate the relationship of the helical pitch of the micelles with respect to the percentage of concentration of the molecules and the chiral additive and the temperature. Generally, as will be seen in FIG. 8, the pitch decreases with the increased concentration of chiral additives while the pitch increases linearly with temperature.

A light valve so constructed utilizes the characteristics of cholesteric liquid crystals without employing an electric field and the structure required to apply that electric field to the liquid crystal, namely transparent electrodes. In accordance with the present invention a nonelectrical light valve is provided without electrodes which has a transmission of approximately 90%. Reduction in transmission is due to the liquid crystalline thermo-chromism. This light valve may be utilized for screening out unwanted sunlight or a variety of other applications, for example, on commercial and residential buildings, greenhhouses, automobiles, eyeglasses, and solar collectors to control the brightness. Unlike other coated glass or plastic products the present light valve alters the brightness which may be applied, for example, during the winter months to allow more light to pass than during the summer months. Energy saving is therefore achieved regardless of climatic conditions. In addition, the present light valve could be used to selectively reflect heat and visible light independently which is temperature controlled thereby enhancing cooling in summer and heating in winter. The light valve is particularly suitable for automobile windshields which during the summer reduces interior brightness but at night turns off and achieves maximum transmission when visibility is what is required.

A great advantage of the present light valve is that each individual micelle can be given a special wave length transition temperature and a sense which may be utilized in combination with other micelles to provide a light valve with enormous variations in its operating characteristics.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. The method of making a light valve which reflects or transmits all wavelengths of light comprising the steps of:
    forming micron sized cholesteric liquid crystal micelles by adding a chiral molecule dopant to a nematic liquid dispersion which twists the micelle into a helical planar order along a helical axis,
    adjusting the pitch of the helical planar order of the micelles by varying the concentration of chiral molecules,
    controlling the sense of the helical planar order of said micelles,
    dispensing said micelles in an inert polymeric binder forming a film which may be applied to a surface to which light to be controlled is applied for controlling the reflection or transmission of said light depending on the temperature of said film,
    applying said film between a quarter wave plate and a plastic polarizer in which the optical axis of the polarizer is at 45% to optical axis of the quarter wave plate whereby no light passes above the transition temperature of said film.

2. The method of making a light valve which reflects or transmits all wavelengths of light comprising the steps of:
    forming micron sized cholesteric liquid crystal micelles by adding a chiral molecule dopant to a nematic liquid dispersion which twists the micelle into a helical planar order along a helical axis,
    adjusting the pitch of the helical planar order of the micelles by varying the concentration of chiral molecules,
    controlling the sense of the helical planar order of said micelles,
    dispensing said micelles in an inert polymeric binder forming a film which may be applied to a surface to which light to be controlled is applied for controlling the reflection or transmission of said light depending on the temperature of said film,
    controlling the helical planar order of said micelles comprises adding equal amounts of right-handed and left-handed sense chiral dopant to said nematic liquid, and
    coating the front and back surfaces of a half-wave plate with said film.

3. A light valve for transmitting and reflecting light in accordance with temperature comprising:
    a polymeric film having micelles of liquid crystal material containing chiral dopants dispersed therein,
    said micelles formed in groups which reflect light from 400 to 600 nanometers in 20 nanometer increments with each group repeated twice to reflect both left and right circularly polarized light,
    said light valve being turned on when a phase transition temperature brings the micelles from a smectic to the cholesteric state.

4. The light valve as claimed in claim 3 wherein a first series of micelle groups are formed of CE2 to E-8 with the weight of CE2 in a range of 15 to 24% in increments of 0.8% and a second series of micelles formed with the optical enantioner of CE2 over the same composition range as said first series.

5. A light valve for transmitting or reflecting on a broad band basis light applied thereto in accordance with the ambient temperature comprising:
    a polymeric film having micelles of liquid crystal material dispersed therein,
    said micelles being formed in a liquid crystalline material with said chiral additives in the form of an optically active molecule, said micelles having a diameter in the range of $2$–$10\mu$ and having the same direction sense,
    a quarter wave plate having said polymeric film mounted to the back surface thereof,
    a polarizer mounted on the front surface of said quarter wave plate, said polarizer having an optical axis making a 45° angle with the optical axis of said quarter wave plate whereby light applied to said valve passes below the transition temperature of said cholesteric material in said film and is extinguished above the transition temperature.

6. The light valve as claimed in claim 3 having a third group of micelles varied to provide a helical pitch in said film in a range of 8 to 15 microns whereby light applied to said film is reflected in the range of 8 to 15 microns below 20° C. while being transmitted above that temperature.

7. A light valve for transmitting and reflecting light in accordance with temperature comprising:
 a polymeric film having micelles of liquid crystalline material having chiral dopants dispersed therein,
 said micelles formed in groups with the chiral dopants having the same sense which groups reflect light from 400 to 600 nanometers in 20 nanometer increments,
 a half wave plate coated on the front and back surfaces with said polymeric film whereby light applied to the front surface of said half wave plate has its circular polarization reversed and is reflected from the back surface below the transition temperature of said film.

8. The method of making a light valve which reflects or transmits substantially 100% of incident light at all or selected wavelengths comprising the steps of:
 preparing cholesteric liquid crystal compositions by varying the concentration of chiral molecules in order to scatter the desired wavelength and polarization by preparing two cholesteric liquid crystal compositions for each selected wavelength, one with right-handed chirality and the other with left-handed chirality,
 dispensing separately for each wavelength and polarization said cholesteric liquid crystal compositions into an inert binder in which the liquid crystalline material remains undissolved and exists as a discontinuous phase within the continuous phase of the inert binder, and
 mixing the dispersions of liquid crystalline material for forming a system of dispersed liquid crystalline material which contains equal concentrations of dispersed bodies of opposite chirality for each wavelength.

9. The method of claimed in claim 8, in which said dispersed bodies are micelles and the mixing step is performed such that said micelles are combined with little agitation such that each micelle maintains its own chiral identity.

10. The method of making a light valve which reflects or transmits substantially 100% of incident light at all or selected wavelengths comprising the steps of:
 preparing cholesteric liquid crystal compositions by varying the concentration of chiral molecules in order to scatter the desired wavelength and polarization by preparing two cholesteric liquid crystal compositions for each selected wavelength, one with right-handed chirality and the other with left-handed chirality,
 dispensing separately for each wavelength and polarization said cholesteric liquid crystal compositions into an inert polymeric binder in which the liquid crystalline material remains undissolved and exists as a discontinuous phase within the continuous phase of the inert polymeric binder,
 mixing the dispersions of liquid crystalline material for forming a system of dispersed liquid crystalline material which contains unequal concentrations of micelles of left-handed and right-handed chiral bodies for selected wavelengths, and includes cholesteric material which scatters light in the 3 to 15 micrometer/region, the visible and near infrared region and includes compositions which scatter light of non-contiguous regions of the spectrum.

* * * * *